Figure 1:
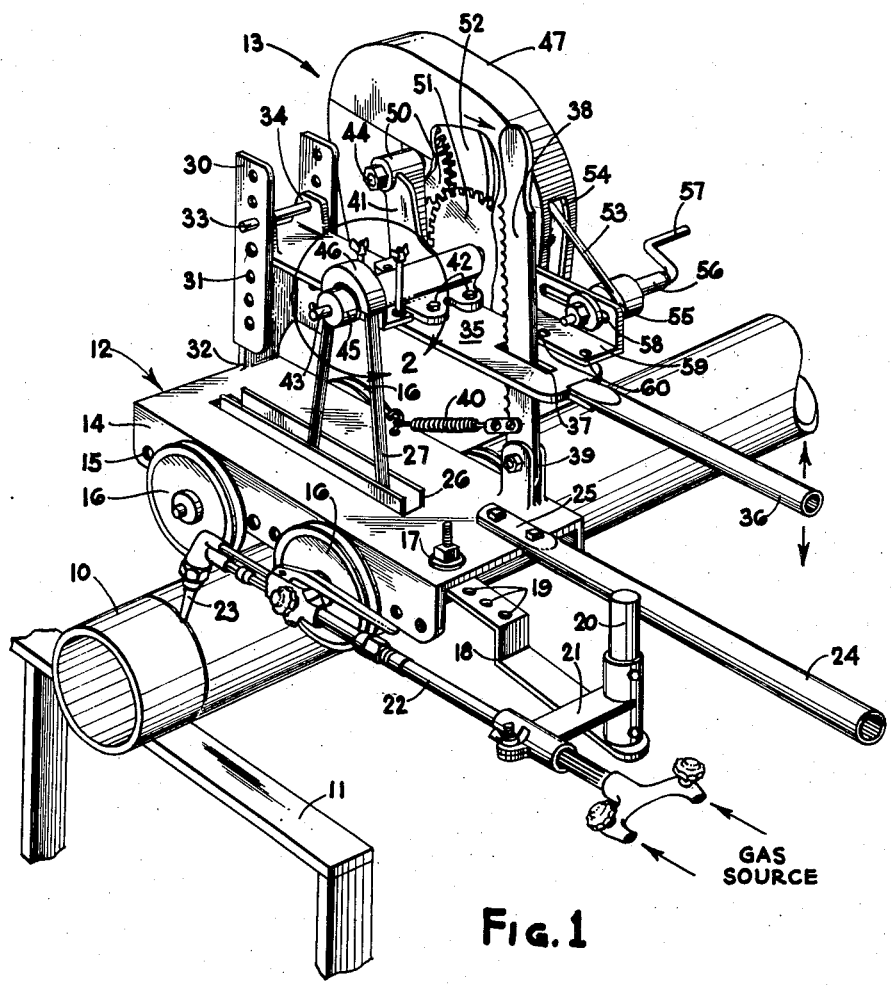

May 6, 1958  T. E. PANNELL  2,833,533
PORTABLE PIPE CUTTING MACHINE
Filed Jan. 9, 1956

INVENTOR.
TIMOTHY E. PANNELL
BY Elliott & Pastoriza
ATTORNEYS

United States Patent Office 2,833,533
Patented May 6, 1958

2,833,533

PORTABLE PIPE CUTTING MACHINE

Timothy E. Pannell, Ventura, Calif.

Application January 9, 1956, Serial No. 557,946

3 Claims. (Cl. 266—23)

This invention relates generally to a portable pipe cutting machine, and more specifically to a machine adapted for circumferential cutting, scarfing, beveling, welding, or the like of pipe, which is readily adaptable for application in conjunction with pipes having a wide range of diameters.

Although the invention is illustratively entitled and described as a pipe cutting or scarfing machine, it will be appreciated that the features involved make the machine suitable with slight modifications to the welding or beveling of pipe and other similar circumferential pipe working operations.

Portable pipe welding and pipe cutting machines are well known, and although they are satisfactory for achieving the particular tooling result desired, most conventional machines involve rather complex mechanical structures and are oftentimes difficult to operate, particularly where cutting operations must be performed on a series of different diameter pipes.

It is, therefore, an object of the present invention to provide a pipe cutting, scarfing, or welding machine of relatively simple mechanical fabrication and construction, which may be readily adapted to pipes dimensioned over a wide range of diameters.

Another object of the present invention is to provide a pipe cutting machine, which may be less expensively manufactured, and which may be more easily manipulated and carried from one working location to another than is possible with present day machines.

A still further object of the present invention is to provide a pipe cutting machine which has very few wearing parts and is correspondingly susceptible of limited maintenance, and yet which is extremely rugged in its design and suitable for precision type work.

These and other objects and advantages of the present invention are generally attained by providing a pipe cutting machine having a torch carriage means provided with rolling supports secured thereto adapted to ride on the peripheral surface of a pipe. Driving means for imparting a relative rotation between the pipe and the carriage means are pivotally connected to the carriage means. A flexible means or member is rotatively secured to the driving means and is adapted to engage the periphery of the pipe. Adjusting means are associated with the driving means, whereby the driving means may be positioned in different spatial relationships with respect to the carriage means. As a consequence, the flexible means used to engage the pipe may be brought into secured relationship with the pipe and thereafter used as a means of causing relative rotation between the pipe and the carriage means.

An important feature of the present invention resides in the fact that a structure is employed such that the flexible means may be readily interchanged, according to the particular diameter pipe upon which the work is being performed, whereby the machine is conveniently used with pipe of all diameters as well as being accurately adjustable to a pipe of any given diameter.

Figure 2:
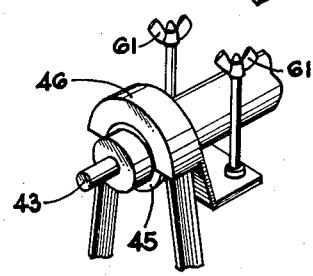

A better understanding of the present invention will be had by reference to the accompanying drawings, illustrating a preferred embodiment of the invention, and in which:

Figure 1 is an isometric view of the pipe cutting machine in position on a pipe; and Figure 2 is an enlarged view of a portion of the apparatus enclosed in the circular arrow 2 of Figure 1.

There is shown in Figure 1 a preferred embodiment of the pipe cutting machine of the present invention disposed in an operating position on a pipe 10, which in turn is mounted on a supporting structure 11. The pipe cutting machine generally comprises a lower carriage assembly 12 to which is hinged an operating assembly 13.

The carriage assembly includes a channel base member 14 provided with a plurality of opposed spaced holes 15 in its opposite side portions. Two pairs of guide wheels 16 are axled, respectively, into two pairs of opposed holes 15 and are spaced a horizontal distance apart according to the particular diameter or range of diameters of pipes being cut. The wheels 16 are adapted to roll on the periphery of the pipe 10.

Pivotably connected to one corner of the base member 14, as by a bolt 17, is a torch supporting arm 18 provided with holes 19 spaced along its length. At its outer end, the arm 18 is provided with an upstanding post 20 on which is adjustably positioned a torch assembly supporting bracket 21. The bracket 21 is designed to clamp onto a torch assembly 22 and secure the torch assembly 22 in a desired relationship to the pipe 10, whereby a torch 23 will be disposed at a given axial cutting location for the pipe cutting operation.

A gripping arm 24 is rigidly secured to the base member 14, as at 25, and is used as a means of manually stabilizing and securely holding the carriage assembly 12 in a convenient working position as the pipe cutting machine is operated.

The base member 14 is further provided with a flanged slot 26 disposed between the opposite wheels 16 and adapted to guidably receive therethrough a flexible member in the form of a V-belt 27. The lower portion of the V-belt is passed around the pipe 10 in a sling-like manner and its upper portion is rotatably connected to the operating assembly in a manner to be subsequently described.

A hinge bracket 30, provided with a plurality of spaced opposing holes 31, is rigidly secured to the base member 14 at 32. A hinge pin 33 is disposed in a given opposite pair of holes 31 and passes through a pair of ears 34 extending upwardly from an adjustable support member 35. Support member 35 terminates at its free end in a handle 36 which is manually used for raising or lowering the support member 35 in the direction of the arrows as shown. A slot 37 is provided near the handle end of the support member 35, and a ratchet rod 38 extends upwardly therethrough being pivotably connected to the base member 14 as at 39. The ratchet rod 38 is biased towards one end of the slot 37, as shown in Figure 1, by a spring member 40 secured to the ratchet rod and to the base member 14.

An angular coupling member 41 has a portion rigidly secured by bolts 42 to the support member 35 and is partially disposed around a lower shaft 43. Another portion of the coupling member 41 terminates about an upper shaft 44. The shafts 43 and 44 are journaled within the coupling member 41 and are rigidly secured thereto in a given spacing with respect to each other and with respect to the support member 35. Thus, any given angular movement of the handle 36 about a pivot point at the hinge pin 33 will cause a corresponding angular movement of the coupling member 41 and, in turn, of the lower shaft 43 and upper shaft 44 journaled therein.

At the outer end of the shaft 43 is mounted a pulley 45 adapted to drive the V-belt 27. The pulley 45 is covered by a removable shield 46, the function of which will be described in connection with the operation of the pipe cutting machine.

The upper shaft 44 is connected within a gear case 47 to a driving pinion 50, which in turn engages a gear 51 connected within the gear case 47 to the lower shaft 43. The pinion 50, is itself, driven by a large diameter pulley 52. A V-belt 53 passes around the pulley 52 and out through a slot 54 in the gear casing 47 to connect with a driving pulley 55. The driving pulley 55 is shown mounted on a shaft 56, which is manually rotatable by handle 57, or which in certain application might be driven through powered means. The shaft 56 is positioned for adjustable belt tension in a slot 58 provided in a right angle bracket member 59 secured to the support member 35 as by bolts 60.

In operation, the guide wheels 16 are first positioned into the proper holes 15 for the particular diameter pipe being used. Thereafter, the shield 46, is more clearly shown in the view of Figure 2, is removed from its position over the pulley 45 by unscrewing the convenient elongated wing nuts 61. Then, according to the particular diameter pipe involved, a V-belt dimensioned accordingly may be placed around the pipe 10 and passed up through the slot 26 over the pulley 45 as illustratively shown with the V-belt 27. Other adjustments may also be made to accommodate unusual size pipe by positioning the pin 33 in different holes 31 and similarly the bolt 17 in different holes 19 of the torch arm 18. Under normal conditions, however, it will usually not be necessary to make any of the above adjustments as the operating assembly 13 is constructed to accommodate the diameters of most pipes encountered in a particular field of work, for example, oil field drilling equipment.

Having made any adjustments that may be required, the machine is positioned on the pipe 10 on the supporting guide wheels 16, and the handle 36 of the adjustable support member 35 is raised upwardly to cinch the V-belt 27 in secure engagement around the pipe 10. The handle 36 is raised to this position by forcing the ratchet rod 38 in the direction of the arrow against the action of the spring 40; upon proper positioning, the ratchet rod 38 may then be released to engage the edge of the slot 27, as shown in Figure 1, and hold the supporting member 35 securely thereto.

Meanwhile, of course, the torch assembly 22 is properly positioned so that the torch 23 is disposed adjacent the particular pipe section to be cut. It is now only necessary to turn the handle 57 and the cutting operation will commence. The rotation of the handle 57 will in turn cause rotation of the pulley 55 to drive the pulley 52, the pinion 50, the gear 51, the shaft 43, and the V-belt 27. The V-belt will in turn rotate the pipe 10 along the supporting structure 11. Because of the guide wheels 16, the carriage assembly 12 and thus the pipe cutting machine as a whole will not rotate but will merely move a given linear distance while the pipe 10 rolls thereunder. Thus, the pipe cutting machine is always maintained in a convenient working position to the operator and he need merely move a small distance, according to the particular diameter of the pipe being cut.

An important feature of the present invention resides in the fact that it may be readily and simply adapted to different diameter pipes, even where the pipes are in a completely different range of diameters. As is evident, it is a simple operation to remove the wing nuts 61 to take off the shield 46 and slide the V-belt 27 off of the pulley 45 to thereby permit installation of a larger or smaller size V-belt as required. Similarly, through the action of the support member 35 with respect to the ratchet rod 38, a precise and yet firm engagement may be caused between the V-belt 27 and the surface of the pipe regardless of the diameters of the various sections of pipe being used.

It is apparent, therefore, that the pipe cutting machine of the present invention provides a mechanically simplified structure, which is conveniently operated, and yet capable of expeditious use.

What is claimed is:

1. A cutting machine for severing pipe comprising, in combination: carriage means; rolling supports on said carriage means adapted to ride about the periphery of said pipe; a torch supported on said carriage; means for positioning said torch adjacent a circumferential point of said pipe whereby rotation of said pipe against said rolling supports will result in said torch following a desired path about the periphery of said pipe; an operating assembly pivotably supported from one end of said carriage for arcuate movement laterally towards and away from said pipe; drive means supported on said assembly; flexible means operatively connected between said drive means and said pipe for rotating said pipe, said flexible means being adjustable by said arcuate movement; securing means for holding said assembly at different lateral distances from said pipe in accordance with the diameter thereof, said securing means comprising a ratchet rod pivoted adjacent the other end of said carriage and extending past the free end of said operating assembly; and, biasing means normally urging said ratchet rod against a portion of said operating assembly to engage said portion and retain said operating assembly in a desired arcuate position.

2. A machine according to claim 1, in which said flexible means comprises a belt passing through an opening in said carriage to pass under said pipe and up through said opening around said drive means, the tension in said belt being adjusted by the lateral distance at which said operating assembly is held from said carriage.

3. A machine according to claim 1, in which the distance between said rolling supports is adjustable whereby said rolling supports can accommodate different diameter pipe.

References Cited in the file of this patent

UNITED STATES PATENTS

| 1,522,687 | Lust | Jan. 13, 1925 |
| 1,879,346 | Lawrence | Sept. 27, 1932 |
| 1,981,340 | Anderson | Nov. 20, 1934 |
| 2,317,526 | Hayes | Apr. 27, 1943 |
| 2,456,088 | Scircle | Dec. 14, 1948 |
| 2,570,527 | Dahl | Oct. 9, 1951 |
| 2,596,322 | Zumwalt | May 13, 1952 |

FOREIGN PATENTS

| 1,081,295 | France | June 9, 1954 |
| 679,731 | Great Britain | Sept. 24, 1952 |